United States Patent [19]

Kviesitis

[11] Patent Number: 5,254,364
[45] Date of Patent: Oct. 19, 1993

[54] METHOD OF MAKING A SOIL COMPOSITION COMPRISED OF CLAY-COATED SAND PARTICLES

[75] Inventor: Boris Kviesitis, Des Moines, Iowa

[73] Assignee: True Pitch, Inc., Altonna, Iowa

[21] Appl. No.: 855,583

[22] Filed: Mar. 23, 1992

Related U.S. Application Data

[62] Division of Ser. No. 521,409, May 10, 1990, Pat. No. 5,151,123.

[51] Int. Cl.$^5$ .................... B05D 7/24
[52] U.S. Cl. .................... 427/214; 427/219; 427/220; 427/221; 428/404; 428/407
[58] Field of Search ............. 427/214, 218, 219, 220, 427/221, 136; 106/287.17, 900; 523/131, 132; 404/75, 76; 405/264; 472/86, 87, 92; 428/403, 404, 407

[56] References Cited

U.S. PATENT DOCUMENTS

| | | | |
|---|---|---|---|
| 2,652,379 | 9/1953 | Hedrick et al. | 106/900 |
| 3,887,506 | 6/1975 | Hewitt | 404/75 |
| 4,792,133 | 12/1988 | Hawkins et al. | 472/86 |
| 4,819,933 | 4/1989 | Armond | 472/92 |
| 4,852,870 | 8/1989 | Hawkins et al. | 472/92 |
| 4,968,024 | 11/1990 | Hawkins | 472/86 |

FOREIGN PATENT DOCUMENTS

| | | | |
|---|---|---|---|
| 52-21129 | 2/1977 | Japan | 405/264 |
| 57-102959 | 6/1982 | Japan | 427/221 |
| 61-44990 | 3/1986 | Japan | 405/264 |

Primary Examiner—Terry J. Owens
Attorney, Agent, or Firm—Zarley, McKee, Thomte, Voorhees & Sease

[57] ABSTRACT

A method of making a soil composition involves continuously mixing sand and plasticizer in an agitation mixer. The sand becomes coated with the plasticizer, whereupon a quantity of clay is then added, followed by an additional portion of the plasticizer. The sand particles coated with the plasticizer become coated with the clay. Coloring pigments are added and mixed thereafter. As soon as complete mixing takes place, the coated sand particles can be immediately transferred from the mixer to suitable packaging. The ingredients are added in the following proportions by weight: sand 50-70%; clay 10-40%; plasticizer 0.5-5.0%; water 5-20%; and coloring pigment 1-5%.

5 Claims, No Drawings

METHOD OF MAKING A SOIL COMPOSITION COMPRISED OF CLAY-COATED SAND PARTICLES

This is a divisional of application Ser. No. 07/521,409 filed on May 10, 1990, now U.S. Pat. No. 5,151,123.

BACKGROUND OF THE INVENTION

This invention arose from a problem that developed in conjunction with molded fiberglas baseball pitching mounds that had an indented compartment forwardly of the pitching rubber for the pitcher to step onto as the pitching motion was completed. That compartment normally was filled with a mixture of sand and clay, but that type of soil composition proved to be relatively unsatisfactory.

First of all, the combination of sand and clay did not drain or dry out very easily. In addition, that soil composition, primarily because of the presence of the clay, would become very hard and had no resiliency. In addition, that soil composition was difficult to work or dress when such was necessary, and would adhere to the shoes of the pitcher.

It is therefore a principal object of this invention to provide a soil composition for athletic fields and the like which has good water draining and drying characteristics.

A further object of this invention is to provide a soil composition that will have resiliency and which will not become hard and packed upon either drying or upon being stepped upon.

A further object of this invention is to provide a soil composition which will not adhere to the footwear of persons walking or running thereon.

A still further object of this invention is to provide a method of making a soil composition which is not time consuming and which requires no drying period.

A still further object of this invention is to provide a soil composition which can be easily worked and shaped.

A still further object of this invention is to provide a soil composition which can be changed to different colors by suitable pigments.

A still further object of this invention is to provide a soil composition that can be easily packaged and transported.

These and other objects will be apparent to those skilled in the art.

BRIEF SUMMARY OF THE INVENTION

The soil composition of this invention is comprised of a mixture of sand, clay, a plasticizer material, water, and a coloring pigment, if desired. The components of the soil composition are preferably present in the following proportions by weight: sand 50–70%; clay 10–40%; plasticizer 0.5–5.0%; water 5–20%; and coloring pigment 1–5%.

The method of making the invention involves continuously mixing a portion of the sand and the plasticizer in an agitation mixer. The sand becomes coated with the plasticizer, whereupon a quantity of clay is then added, followed by an additional portion of the plasticizer material. It is particularly important that the sand particles become coated with the plastizing compound and clay. The coloring pigments are added and mixed thereafter. As soon as complete mixing takes place, the material can be immediately transferred from the mixer to suitable packaging.

DESCRIPTION OF THE PREFERRED EMBODIMENT

The following tables show the preferred ingredients by weight of the soil composition of this invention.

TABLE I

| Ingredient | Range | Preferred |
|---|---|---|
| Sand (Silicon Dioxide) | 50–70% | 60% |
| Polymer (Polyvinyl Alcohol) | 0.5–5.0% | 1% |
| Water ($H_2O$) | 5–20% | 11% |
| Clay (Hydrated Aluminum Silicate) | 10–40% | 26% |
| Coloring Pigment | 1–5% | 2% |

TABLE II

| Ingredient | Range | Preferred |
|---|---|---|
| Sand (Silicon Dioxide) | 50–70% | 60% |
| Polymer (Polyvinyl Alcohol) | 0.6–5.0% | 1% |
| Glycerol (Plasticizer) | 0.2–3.0% | 0.5% |
| Water ($H_2O$) | 5–20% | 11% |
| Clay (Hydrated Aluminum Silicate) | 10–40% | 25.5% |
| Coloring Pigment | 1–5% | 2% |

Polyvinyl alcohol could be added or substituted with other polymers which possess plastizing properties. Other suitable polymers would be polyvinyl acetate, polyvinyl chloride, or natural or synthetic rubber latex. Also, glycerol may be used.

The preferred method of making the soil composition of this invention involves mixing the polyvinyl alcohol with water in the proportions indicated to create a plasticizer in the form of a viscous-like substance. A quantity of sand is introduced into an agitation mixture, and a portion of the plasticizer is introduced into the mixer to coat the sand. A portion of clay is then introduced into the mixer, whereupon plasticizer, sand and clay are introduced in turn in accordance with the above proportions to complete the composition. Care should be exercised to introduce the plasticizer following the introduction of additional sand so that the sand particles can be coated with both the plasticizer and the clay. A suitable pigment, such as iron oxide, can be added towards the end of the mixing cycle.

The time for the mixing cycle is obviously variable depending upon the quantity of composition being mixed. It is also preferable that the mixing take place at high speed to disperse the materials throughout the mixture. The plasticizer can be sprayed into the mixer to facilitate the even distribution thereof over the particles of sand.

As soon as the composition is suitably mixed, it can be immediately transferred to plastic bags or the like without any drying operation.

The resulting composition is pliable and can be easily worked to a given shape. It will not become hardened, it dries easily, and it will not adhere to the spikes or shoes of the players.

The soil composition of this invention is a substantial improvement over the prior use of clay, sand, or a mixture thereof. It has many useful applications on various types of athletic fields, walk ways, and innumerable other environments.

It is therefore seen that this invention will achieve at least all of its stated objectives.

I claim:

1. A method of making a granulated, flowable, pliable, non-adhering, non-toxic, substantially dry soil composition, comprising:
   a) placing sand particles in an agitation mixer;
   b) adding to said sand particles at least one coating material selected from the group consisting of polyvinyl alcohol, polyvinyl acetate, polyvinyl chloride, natural or synthetic rubber latex, and glycerol to form a coating on said sand particles; and
   c) adding clay to said agitation mixer to form a coating of clay on said sand particles coated in step b).

2. The method of claim 1 wherein said coating material is a mixture of polyvinyl alcohol and water.

3. The method of claim 1 wherein said sand, clay, and said coating material comprise the following approximate respective proportions by weight of said composition: 60%, 26%; 1%; with water comprising at least approximately 11% by weight of said composition.

4. The method of claim 1 wherein said sand, said clay, and said coating material comprises the following respective portions by weight of said composition: 50–70%; 10–40%; 0.5–5%; with water comprising approximately 5–20% by weight of said composition.

5. The method of claim 1 wherein pigment is added to said composition.

* * * * *